United States Patent [19]

Chevin et al.

[11] 4,255,047

[45] Mar. 10, 1981

[54] PHOTOGRAPHIC PRINTING OF SUPERIMPOSED IMAGES

[75] Inventors: Sidney Chevin, Ilford; Philip S. Fisher, London, both of England

[73] Assignee: Studio 21 (Sales) Ltd., Ilford, England

[21] Appl. No.: 17,474

[22] Filed: Mar. 5, 1979

[30] Foreign Application Priority Data

Mar. 10, 1978 [GB] United Kingdom ............... 9627/78

[51] Int. Cl.³ ............................................. G03B 27/02
[52] U.S. Cl. ..................................... 355/79; 354/296
[58] Field of Search ................... 354/296; 355/71, 74, 355/77, 79, 68, 83

[56] References Cited

U.S. PATENT DOCUMENTS 3,674,365   7/1972   Köhler et al. ........................ 355/74

FOREIGN PATENT DOCUMENTS 2718022  11/1978  Fed. Rep. of Germany ............. 355/74

Primary Examiner—Richard A. Wintercorn
Attorney, Agent, or Firm—Mark W. Gehan

[57] ABSTRACT

Apparatus is disclosed enabling superimposed images to be readily and easily printed on photographic paper. The apparatus employs a transparent member, carrying one or more masks, which is arranged between a photographic negative holder and a photographic paper support in a photographic printing machine. Means are provided for moving the transparent member and for sensing and indicating the position of at least one of said masks.

16 Claims, 12 Drawing Figures

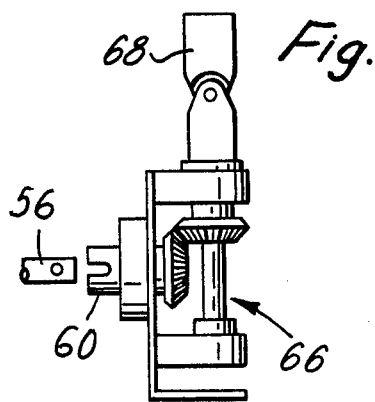
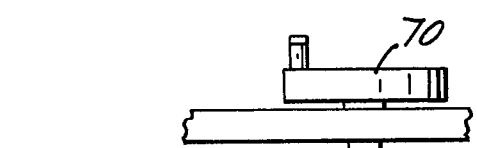
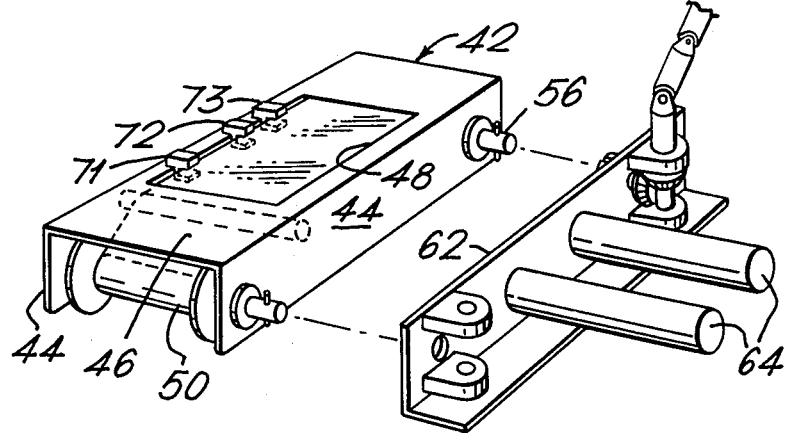
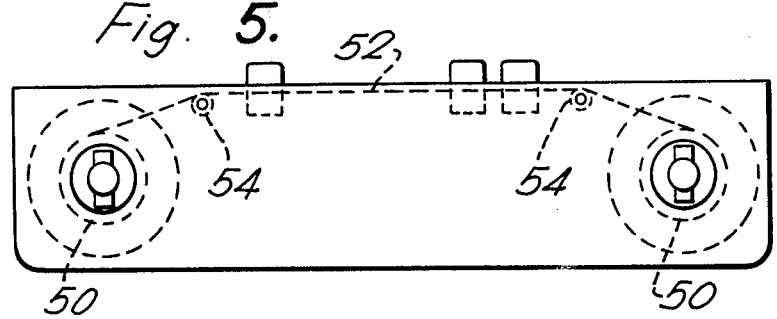

PHOTOGRAPHIC PRINTING OF SUPERIMPOSED IMAGES

BACKGROUND OF THE INVENTION

The present invention relates to the photographic printing of superimposed images, and particularly to apparatus for enabling superimposed images to be printed on photographic paper.

It is often required to produce a photograph which comprises two or more superimposed images. Some skilled photographers can produce such a photograph in the camera but the technique is time-consuming and the results cannot be seen until the film has been developed. In addition, the range of photographs that can be produced in this way is limited.

Often two or more images are superimposed during the printing stage. However, the finished print has to be composed by the manual positioning of masks even though a machine is used for the printing.

The present invention seeks to provide apparatus for enabling superimposed images to be printed which can position masks within a photographic printing machine.

SUMMARY OF THE INVENTION

According to the present invention there is provided a photographic printing machine for printing positives from negatives, the machine comprising a holder for a negative, a support for photographic paper, means for controllably exposing the photographic paper to light, and apparatus for enabling superimposed images to be printed on photographic paper, said apparatus comprising a transparent member interposed between said photographic negative holder and said photographic paper support, said transparent member carrying at least one mask, means for moving said transparent member, and means for sensing and indicating the position of said mask.

Preferably, the transparent member is a length of transparent film and a plurality of masks are longitudinally spaced along the film.

In one embodiment each end of the length of transparent film is attached to a respective one of two spaced rolls and the film is arranged to be wound on one or both rolls. Thus, on rotation of the rolls the film moves longitudinally from one roll to the other. Drive means, which may be mechanical and/or electrical, may be provided to rotate the rolls and thereby cause longitudinal movement of the film.

In a further embodiment the film is endless and is arranged to be circumgyrated by way of two rollers. In this case, the upper run of the film is interposed between said negative holder and said photographic paper support and the lower run thereof extends on the side of the photographic paper support remote from the negative holder.

The apparatus may have a housing for supporting the film and/or the means for moving the film. Preferably, a wall of the housing has an aperture and the film is arranged to move across the aperture substantially parallel to the wall.

A light transmitting system may be arranged between the negative holder and the photographic paper support, the light transmitting system including a lens. Where said apparatus includes a housing with an aperture, the center of the aperture is positioned on the axis of the lens. Preferably, the light transmitting system includes an enlarger and the lens is movably mounted.

Preferably, sensing and indicating means are utilized which comprise one or more sensors arranged adjacent said aperture and one or more markers arranged on said film and associated with a mask or with respective masks. In one embodiment three sensors are arranged adjacent said aperture and one marker is arranged on or adjacent each mask. Signals from said sensors are fed to means, such as a counter, for indicating which of said masks is aligned with the aperture. In addition, signals from said sensors are fed to other indicating means, such as signal lamps.

In one embodiment said sensors are photoelectric sensing devices and said markers are strips of light absorbing material, such as black tape, affixed to the masks. An electrical circuit connects said photoelectric sensing devices to a digital counter and includes means for providing an output signal to said counter upon receipt of a signal from a selected one of the photoelectric sensing devices. Preferably, said digital counter is arranged to count both up and down. Preferably, said electrical circuit also includes logic means arranged to illuminate or extinguish the illumination of one or more signal lamps upon receipt of a signal from one or two of the photoelectric sensing devices.

In one embodiment, said housing is removably mounted on a support bracket.

In one embodiment, said film is an acetate film. However, any transparent film which is sufficiently rigid to extend across the aperture without support and without sagging may be used. In particular, any transparent cellulosics film with sufficient rigidity may be used.

The present invention also extends to a method of printing superimposed images on photographic paper using a machine as defined above.

The invention also extends to photographic prints of superimposed images when printed using the machine as defined above.

DETAILED DESCRIPTION OF THE INVENTION

Embodiments of the present invention will hereinafter be described, by way of example, with reference to the accompanying drawings, in which.

Figure 1:
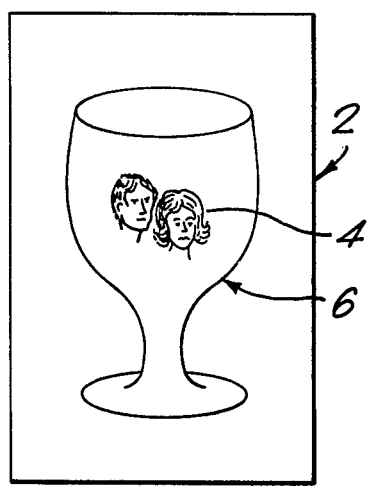
FIG. 1 shows schematically a photographic print having two superimposed images.
Figure 2A:
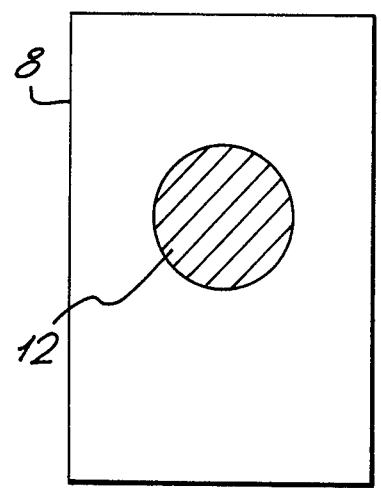
FIGS. 2a and 2b illustrate two masks used for printing the print of FIG. 1.
Figure 2B:
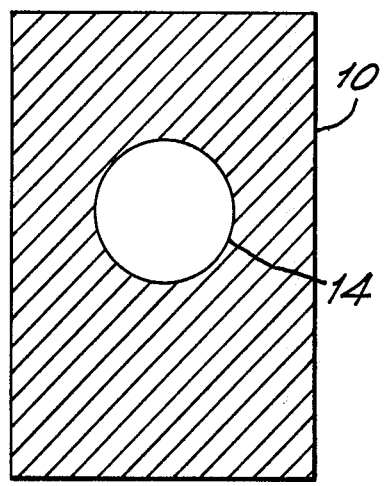
Figure 2C:
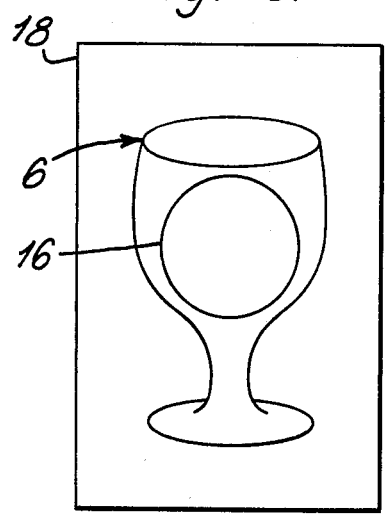
Figure 3:
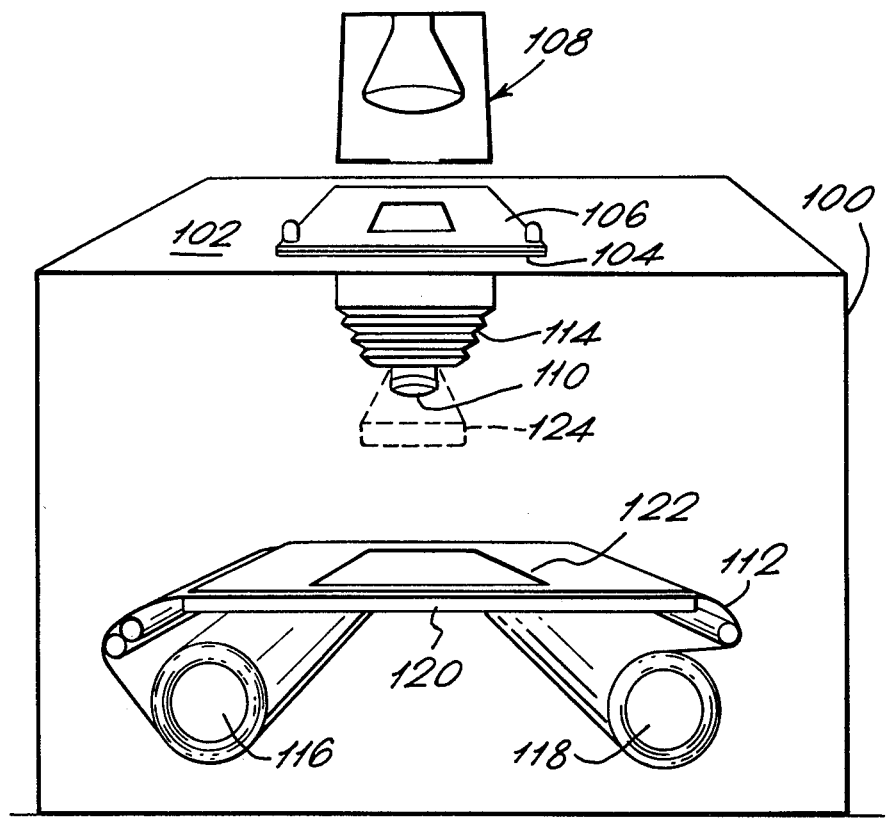
Figure 6:
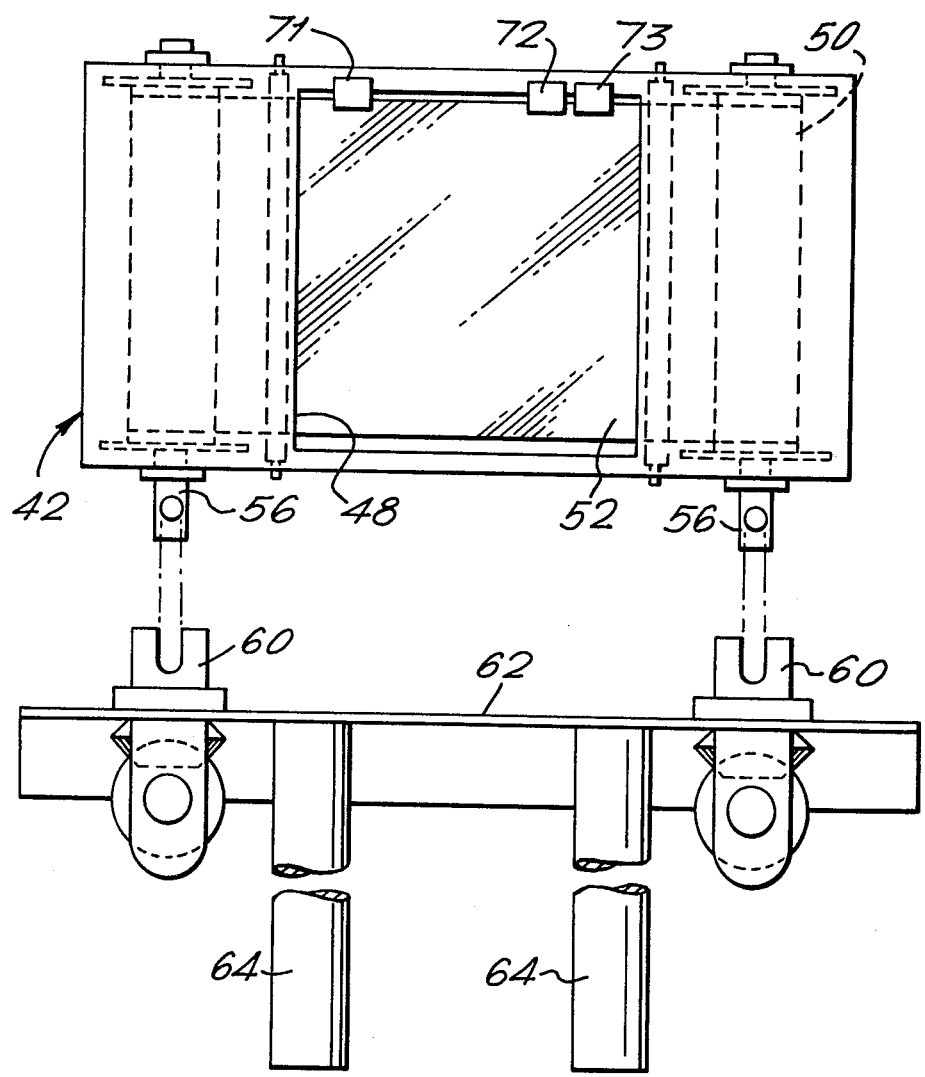
Figure 7:
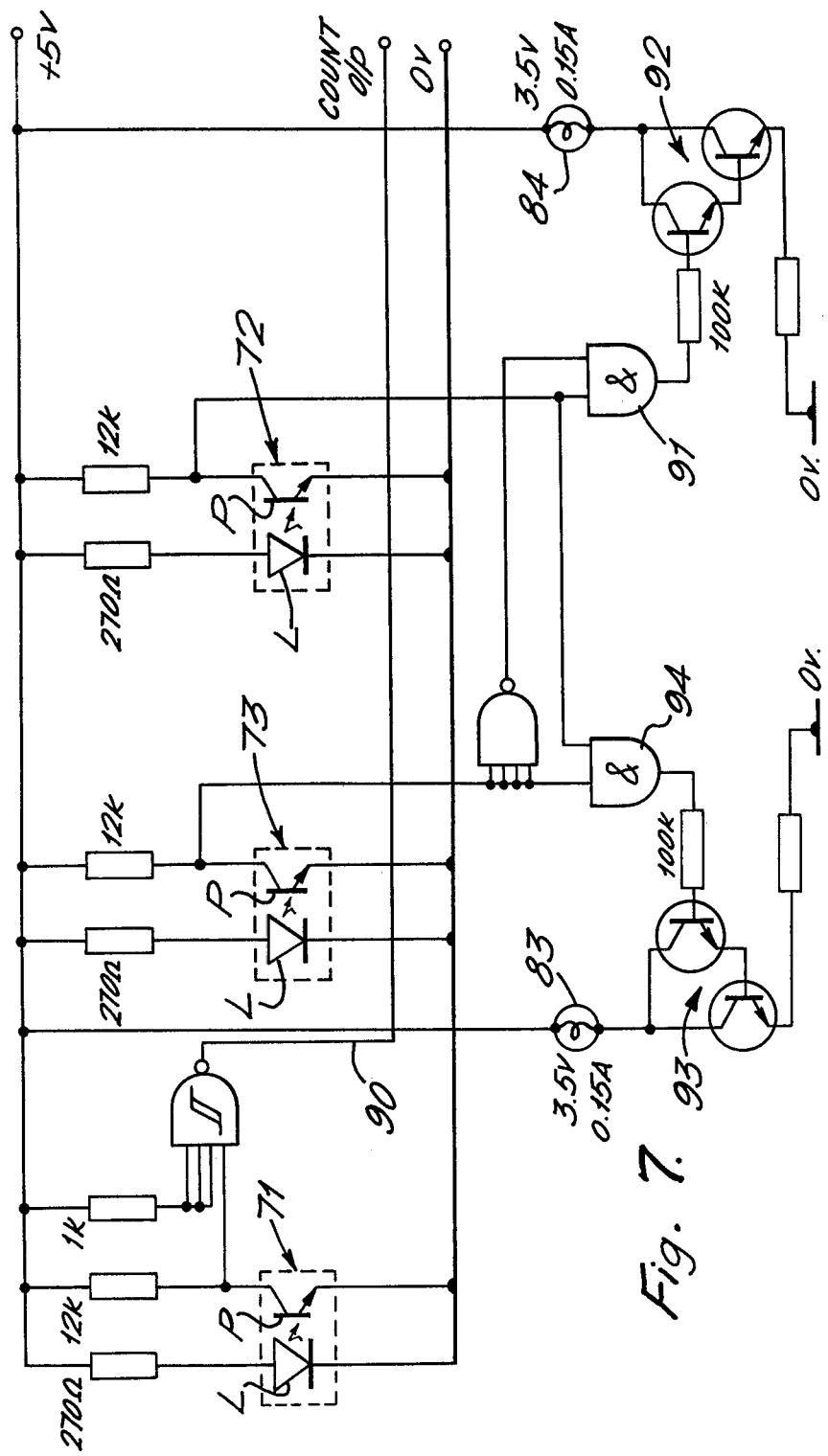
Figure 8:
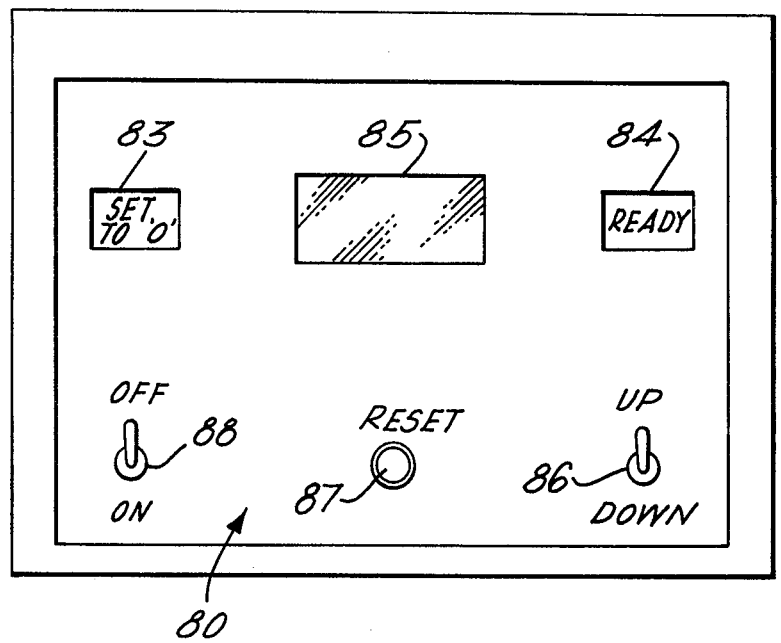
Figure 9:
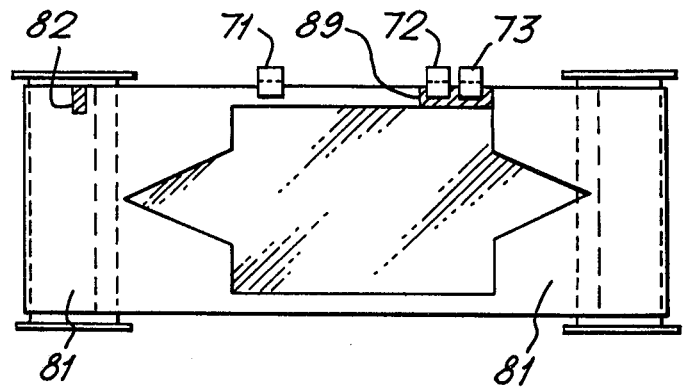

FIG. 2c illustrates schematically an intermediate stage in the formation of the print of FIG. 1, FIG. 3 shows schematically a printing machine for printing positives from negatives, FIG. 4 illustrates an exploded perspective view of apparatus of the invention for enabling superimposed images to be printed on photographic paper, FIG. 4a illustrates part of the drive means of the apparatus of FIG. 4, FIG. 5 shows a side elevation of a film-carrying cassette forming part of the apparatus of FIG. 4, FIG. 6 shows an exploded plan view of the apparatus of FIG. 4, FIG. 7 shows a circuit diagram of a position indicating and detecting device for the apparatus of FIG. 4, FIG. 8 shows a plan view of a control panel for the apparatus of FIG. 4, and FIG. 9 shows schematically a plan view of the film in the cassette of FIG. 4.

FIG. 1 shows schematically a photographic print 2 having two superimposed images. In this case, an image generally referred to by reference numeral 4 of the two people is superimposed within an image generally referred to by numeral 6 of a glass.

FIG. 2a and 2b illustrate masks 8 and 10 which could be used to produce the finished print 2 of FIG. 1. The mask 8 is generally transparent but has a circular black area 12, which is opaque to light, arranged thereon. The mask 10 is the reverse of mask 8 being generally opaque but having a circular aperture 14 therein. The aperture 14 is thus transparent. The areas 12 and 14 have substantantially the same diameter and are each arranged relative to the respective mask so that they are in the same position.

To form the print 2, the mask 8 shown in FIG. 2a is first laid above photographic paper on which the print is to be formed. A negative of the image 6 of the glass is then positioned above the mask 8 and the negative is printed onto the photographic paper in the normal way through the mask 8. If, after this step the photographic paper were developed the result would be the print shown in FIG. 2c in which the image 6 of the glass can be seen but in which a white blank area 16 is formed. The area 16 is of the same size as the area 12 to which it corresponds. Normally, of course, the photographic paper would not be developed at this stage. The process is then continued by removing the mask 8 and the negative of the glass. The mask 10 is then placed above the photographic paper in the position originally occupied by the mask 8. Hence, the aperture 14 corresponds to the unprinted blank area 16 on the photographic paper. A negative of the image 4 of the couple is positioned above the mask 10 so that it is then possible to print the image 4 of the couple in the area 16. Thus, upon subsequent development of the photographic paper a print as shown schematically in FIG. 1 is formed.

It will be appreciated that for acceptable results it will generally be necessary to ensure that the mask 10 is positioned over the photographic paper in exactly the same position as that earlier occupied by the mask 8 so that each of the negatives in turn is printed on undeveloped photographic paper.

Photographs are generally printed commercially using a machine for printing images from negatives onto photographic paper. Such a machine is sold, for example, by Durst under the name "Mini Printer". A printing machine is schematically illustrated in FIG. 3. It is only described briefly herein as such machines are well known.

The printing machine shown in FIG. 3 comprises a light-tight cabinet 100 having a top surface 102 in which a transparent plate 104 is formed. A negative holder 106 is provided which is slidable over the transparent plate 104 such that a photographic negative may be suitably positioned above the transparent plate. A light source 108 is arranged to project light through the negative holder 106 and the transparent plate 104 and a lens 110 is arranged within the cabinet 100 and adapted to focus by means focusing means 124 shown in dotted lines the image of the negative onto photographic paper 112 arranged within the cabinet. Generally, the distance of the lens from the photographic paper can be varied as required, by way of a bellows 114. The bellows 114 is mounted on the underside of the top surface 102 and thus supports the lens 110 within the cabinet.

The photographic paper 112 is wound from a supply roller 116 to a take-off roller 118 and passes over a horizontal support 120 arranged beneath the lens. A mask 122 is arranged above the paper 112 and centered on the axis of the lens 110. This mask 122 is used to define the borders of each print. The mask 122 may also be arranged to control the feed of paper from the supply roller 116 to the take-off roller 118. Means (not shown) for automatically feeding the paper a desired distance are also generally provided.

When such a machine is used for printing single photographic prints in the normal manner from single negatives the negatives are placed in turn in the negative holder 106 so that they are on the transparent plate 104 in the top surface 102 of the machine. Actuation of the machine enables light from the light source 108 to pass through the negative and the lens 110 so that the image is developed on the photographic paper 112 on the horizontal support 120. The paper is then moved onto the take-off roller 118 a suitable amount so that it is ready to receive the next image. When all of the paper has been wound onto the take-off roller 118, the paper is removed from the machine and developed to produce the finished prints. The printing of the images from the negatives on to the photographic paper thus takes place relatively quickly in a light-tight environment.

It is possible to use such a printing machine to produce prints of superimposed images such as illustrated in FIG. 1. However, it is necessary in this case firstly to open the cabinet 100 to position the first mask 8 over the mask 122. The cabinet is then closed and a print is made of a first negative. Then the cabinet is opened to remove the mask 8 and to insert the mask 10 in the same position. A print is then made of the second image. The mask 10 then has to be removed from the cabinet. Of course, as the photographic paper is light sensitive the cabinet can only be opened in the dark which makes it difficult to correctly position the masks. In addition, as the masks have to be placed in position manually and then removed the process is time-consuming.

FIGS. 4 to 9 illustrate an embodiment of apparatus of the present invention which may be incorporated in a machine such as that briefly described above to enable superimposed images to be printed on photographic paper more quickly and more easily. FIG. 4 shows an exploded perspective view of the apparatus which comprises a film-carrying cassette generally referenced 42 having two side walls 44 joined by a top wall 46. A square aperture 48 is provided in the top wall 46. The side walls 44 support two rolls 50 which are spaced longitudinally of the top wall 46 and extend transversely thereof with their axes substantially parallel. A length of transparent film 52 (FIG. 5) extends between the two rolls 50 and each end of the film 52 is attached to a respective one of the rolls. The film 52 is wound onto the rolls 50 such that a length thereof extends beneath the aperture 48. Two guide rollers 54 are provided one on either side of the aperture 48 so that the length of film visible through the aperture 48 extends substantially parallel to the top wall 46. The film 52 is transparent and is sufficiently rigid to extend substantially parallel to the top wall 46 without support. In a preferred embodiment the film 52 is an acetate film but any other cellulosics film with the necessary rigidity and transparency can be used. The axle 56 (FIGS. 4 and 5) of each roll 50 is removably and non-rotatably received in a rotatable bushing 60 carried by a bracket 62. The bracket 62 is carried on two rods 64 which can be bolted to a side wall of the machine. The length of the rods 64 is arranged such that when the apparatus is supported in a printing machine the center of the aperture 48 is axially aligned with the central axis of the lens provided in the machine. The position of the apparatus within the printing machine is indicated by dashed lines 124 in FIG. 3.

It will be seen from the above that the cassette 42 supporting the film 52 may be moved into or out of engagement with the supporting bracket 62. Thus, in use the bracket 62 would be rigidly connected to a printing machine by way of the rods 64 and different cassettes engaged therewith as required.

The bushings 60 are each connected by way of a gear drive 66 (FIG. 4a) to a drive chain 68 the other end of which is connected to a respective knob 70 provided on a face of the machine. It will hence be seen that when a cassette 42 is carried by the bracket 62 rotation of the two knobs 70 (only one of which is shown in FIG. 4) will cause rotation of the rolls 50 by way of the drive chains 68, the gearing 66, and the bushings 60. Hence, the film 52 will be translated relative to the aperture 48.

The drive shown in the drawings is by way of example only. Any other suitable type of drive for translating the film may of course be used. For example, if required, electrical drive means may be provided.

Along a longitudinally extending edge of the aperture 48 there are provided three spaced photoelectric sensing devices 71, 72 and 73. These photoelectric sensing devices 71, 72 and 73 are electrically connected into a position indicating and detecting device which is illustrated in FIG. 7 and described in more detail below. As can be seen from FIG. 4 each of the sensing devices 71, 72 and 73 has a substantially C-shaped cross-section defining two facing surfaces of substantially equal size. Preferably, the sensing devices are all equal in size. A light emitting diode (LED) (not shown) is mounted in one facing surface of each device 71, 72 and 73 and an associated photoelectric transistor (not shown) is mounted in the other facing surface of each device 71, 72 and 73.

The length of film 52 carries along its length a number of spaced masks such as those shown in FIGS. 2a and 2b. One such mask is represented at 81 in FIG. 9. Along one longitudinally extending edge of each mask a marker 82 is arranged. In the present embodiment each marker 82 comprises a thin strip of black tape extending transversely to the edge. Each marker 82 is at least equal in dimensions to the dimensions of the facing surfaces of the devices 71, 72 and 73 such that when a marker 82 is positioned between the facing surfaces of one of the devices 71, 72 and 73 it prevents light from the LED from falling on the associated photoelectric transistor. The film 52 is received on the rolls 50 and guided so that the markers 82 on the edge of the masks pass within the C-section of the photoelectric sensing devices 71, 72 and 73.

The signals derived from the photoelectric sensing devices 71, 72 and 73 are used to control a digital counter (not shown) and indicator lights 83 and 84 which are provided in a control panel 80 (FIG. 8) provided externally of the machine. The digital counter, which has a display 85 provided in the panel 80, is arranged to count both up and down. The direction of counting is controlled by actuation of a two position switch 86 mounted in the panel 80. Further, a reset button 87 for the digital counter is provided in the panel 80 together with an on-off switch 88 for the position indicating and detecting device.

At one end the film 52 has a position which is the "zero" position. The zero position is marked by an additional marker 89 positioned along one longitudinally extending edge of the mask 81 at the zero position. The longitudinal extent of this marker 89 is such that the marker 89 may extend between the two sensing devices 72 and 73 cutting off the light falling on the photoelectric transistors from their associated LEDs simultaneously.

Preferably, the mask 81 at the zero position has an aperture provided therein which has the same or larger dimensions than the aperture 48. Hence, when the aperture in the film 52 is positioned beneath the aperture 48 there is nothing interposed between the lens and the photographic paper in the machine. Of course, the mask including the aperture may be provided at any position along the film 52 but it is convenient for this mask to be positioned at the zero position.

In use, a cassette 42 including a film 52 carrying the required masks is placed in a photographic printing machine and the machine cabinet is closed so as to be light-tight.

The cassette 42 is inserted with the aperture at the zero position of the film 52 in alignment with the aperture 48. The reset button 87 is then pressed so that the digital counter is set to zero. The display 85 then shows zero. The knobs 70 are then rotated to align the markers 89 associated with the zero position with the photoelectric sensing devices 72 and 73. When the marker 89 is aligned with both sensing devices 72 and 73 the "set to zero" light 83 is illuminated, and the "ready" light 84 is illuminated. In this position of the film 52 the machine can be used in the usual way to print positives from single negatives.

When it is desired to print superimposed images the operating steps described with reference to FIGS. 2a, 2b and 2c can be used employing the masks arranged on the film 52. In this respect the operator is given a chart showing the digital reading for each particular mask on the film 52. Thus, the mask shown in FIG. 2a could be shown to have the counter number 1 whilst the mask 10 in FIG. 2b the counter number 2. If the operator wishes to use the mask at position 1 he rotates the knobs 70 until the mask on the film is brought into the aperture 48. When the marker 82 on the mask passes the sensing device 71 an output is fed to the digital counter which counts one position. When the marker 82 is subsequently aligned with the sensing device 72 the ready light 84 is illuminated indicating that the mask at position 1 is correctly positioned. The operator can then place the correct negative in the machine and print onto the photographic paper through the positioned mask. The photographic paper is held in the same position and the operator then moves the film 52, again by the knobs 70 until the digital counter shows "2" and the "ready" light 84 is again illuminated. The operator then knows that the second mask is correctly positioned and he can repeat the printing operation with the second negative. The desired images are then printed on the photographic paper.

A circuit for the position indicating and detecting device is illustrated in FIG. 7. It will be seen from this that each photoelectric sensing device 71, 72 and 73 comprises a light emitting diode L normally arranged to supply light to a photoelectric transistor P. It will be appreciated that when the light supply to a transistor P is cut off by placing a marker 82 or 89 between the transistor P and its associated diode L the transistor P is switched off. In the case of sensing device 71 switching off the transistor P produces an output signal on line 90 which is fed to a conventional digital counter (not shown). It will be seen that when the transistor P of sensing device 72 is switched off the output of AND gate 91 is effective to change the state of conventional "Schmidtt" trigger circuit 92 which then acts to illuminate the ready lamp 84. Of course, when the transistor P of the device 72 is again rendered conductive the conventional "Schmidtt" trigger circuit 92 extinguishes the ready lamp 84. It will also be appreciated that the set to zero lamp 84 is only illuminated by way of "Schmidtt" trigger circuit 93 when input signals are fed to both inputs of AND gate 94, that is, when both the transistors of devices 72 and 73 are switched off.

In a preferred embodiment the film 52 carries between sixty and one hundred and twenty masks, half of which are negatives of the others. The operator can position any of these masks between the lens and the photographic paper by transporting the film 52 until the required number is shown on the counter. The counter is arranged to count up whilst the film is transported in one direction and, by the operation of an appropriate conventional switch 86 can be made to count down when the film is transported in the other direction. In this way the operator can easily and quickly position any required masks. If required, the counter can be made to count up or down automatically in accordance with the direction of movement of the film.

If the operator wishes to return to the normal printing of single images from single negatives he returns the film to its end position, zero on the counter, in which the aperture therein is aligned with the aperture 48.

It will be apparent that several cassettes with different masks therein can be provided and the cassettes can be changed as required.

The cassette described above is particularly convenient to use and can be quickly and easily mounted into a printing machine. However, if preferred, a transparent film or plate carrying longitudinally spaced masks could be mounted in the machine for movement in the longitudinal direction of the film or plate. In this case, the sensors for the indicating and detector circuit would conveniently be mounted along guide means provided in the machine for the film or plate. Alternatively, the masks could be arcuately spaced on a circular film or plate rotatably mounted in the machine.

It will be seen from the above that the apparatus of the invention enables superimposed images to be printed quickly and reliably on conventional printing machines. The position indicating and detector circuit ensures that each mask is correctly positioned.

The apparatus can be provided in any photographic printing machine. It is simply necessary to position the apparatus such that the masks carried by the film or plate will be centered on the central axis of the lens. The film or plate can be arranged to move longitudinally with respect to the longitudinal movement of the photographic paper or transversely of this direction. Alternatively, the film or plate can be rotated so that the masks are moved into and out of position.

Of course, sensors other than the conventional photoelectric sensing devices described herein can be used to detect the positions of the masks.

The apparatus of the invention is not confined to use for the printing of two superimposed images as specifically described. If required, more than two images can be superimposed. Alternatively, a mask can carry one of the images to be printed simultaneously with a negative.

The apparatus can be used for black-and-white or color photography. Although the apparatus is described in conjunction with a particular type of photographic printing machine it may be used with any photographic printing machine.

We claim:

1. A photographic printing machine for printing positives from negatives, the machine comprising a holder for a negative, a support for photographic paper, exposure means for controllably exposing the photographic paper to light, and apparatus for enabling superimposed images to be printed on photographic paper, said apparatus comprising a transparent member interposed between said photographic negative holder and said photographic paper support, said transparent member carrying at least one mask having at least one marker on a selected portion thereof, and photoelectric means for photoelectrically sensing said marker and means for indicating the position of said mask relative to said exposure means.

2. A printing machine according to claim 1, wherein said transparent member is elongate and a plurality of masks are longitudinally spaced along said transparent member.

3. A printing machine according to claim 1, wherein said transparent member is a length of transparent film, and wherein each end of said film is attached to a respective one of two spaced rolls and said film is arranged to be wound on said rolls.

4. A printing machine according to claim 3, further comprising drive means arranged to cause rotation of at least one of said rolls to thereby cause longitudinal movement of said film.

5. A printing machine according to claim 1, wherein said transparent member is an endless length of transparent film arranged to be circumgyrated by way of two rollers, the upper run of the film being interposed between said negative holder and said photographic paper support and the lower run of the film extending on the side of the photographic support remote from the negative holder.

6. A photographic printing machine for printing positives from negatives, said machine comprising a holder for a negative, a support for photographic paper, exposure means for controllably exposing the photographic paper to light, and apparatus for enabling superimposed images to be printed on photographic paper, said apparatus being interposed between said negative holder and said photographic paper support and comprising a housing having at least one wall, an aperture in said wall, a length of transparent film supported within said housing for movement across said aperture substantially parallel to said wall, said length of transparent film carrying a plurality of masks longitudinally spaced along said transparent film and having at least one marker on a selected portion thereof, means for moving said transparent film relative to said aperture, and photoelectric means for photoelectrically sensing said marker and means for indicating the position of said transparent film relative to said aperture.

7. A printing machine according to claim 6, wherein said housing is removably mounted on a support bracket.

8. A printing machine according to claim 6, wherein a light transmitting system including a lens is arranged between said negative holder and said photographic paper support, and wherein the center of said aperture in the wall of the housing is positioned on the axis of the lens.

9. A printing machine according to claim 8, wherein said light transmitting system comprises an enlarger and wherein said lens is movably mounted.

10. A printing machine according to claim 6, wherein said sensing and indicating means comprises at least one sensor arranged adjacent said aperture and at least one marker arranged on said film and associated with respective masks.

11. A printing machine according to claim 10, wherein three sensors are arranged adjacent said aperture and one marker is arranged on or adjacent each said mask.

12. A printing machine according to claim 11, wherein said sensing and indicating means comprises a digital counter responsive to signals from a first one of said sensors, first indicating means responsive to signals from a second one of said sensors, and second indicating means responsive to simultaneous signals from said second sensor and a third one of said sensors.

13. A printing machine according to claim 11, wherein each sensor comprises a photoelectric transducer arranged to receive light from an associated light emitting device, and each marker comprises a strip of light absorbing material, and wherein the film is arranged to be moved such that each marker moves between the photoelectric transducer and its associated light emitting device.

14. A printing machine according to claim 13, wherein each sensor has a substantially C-shaped cross-section defining two facing surfaces, and wherein said photoelectric transducer is mounted in one of said facing surfaces and the associated light emitting device is mounted in the other of the facing surfaces, the film being arranged with one longitudinal edge extending between said facing surfaces and each marker being arranged on said longitudinally extending edge.

15. A printing machine according to claim 13, wherein each photoelectric transducer comprises a photoelectric transistor and wherein each light emitting device comprises a light emitting diode.

16. A printing machine according to claim 6, wherein said transparent film comprises a transparent cellulosic film.

* * * * *